United States Patent
Stiscia et al.

(10) Patent No.: US 8,244,135 B2
(45) Date of Patent: Aug. 14, 2012

(54) SYSTEM AND METHOD FOR INCREASING UPSTREAM OPTICAL CODING GAIN IN A GIGABIT PASSIVE OPTICAL NETWORK (GPON)

(75) Inventors: James J Stiscia, Garner, NC (US); Jihad Baghdadi, Raleigh, NC (US)

(73) Assignee: Alcatel Lucent, Paris (FR)

( * ) Notice: Subject to any disclaimer, the term of this patent is extended or adjusted under 35 U.S.C. 154(b) by 850 days.

(21) Appl. No.: 12/273,615

(22) Filed: Nov. 19, 2008

(65) Prior Publication Data

US 2010/0129086 A1 May 27, 2010

(51) Int. Cl.
*H04J 14/08* (2006.01)
*H01J 3/16* (2006.01)

(52) U.S. Cl. .............. 398/98; 398/66; 398/67; 398/99

(58) Field of Classification Search .............. 398/66–67, 398/98–99, 43, 182
See application file for complete search history.

(56) References Cited

U.S. PATENT DOCUMENTS

2008/0089685 A1* 4/2008 Kazawa et al. .............. 398/66
2008/0089686 A1* 4/2008 Kazawa et al. .............. 398/71

OTHER PUBLICATIONS

ITU-T G.984.3 series G:Transmission Systems and Media, Digital Systems and Networks "Gigabit-capable Passive Optical Networks(G-PON): Transmission convergence layer specifications," Feb. 2004, p. 92.*

* cited by examiner

*Primary Examiner* — Jessica Stultz
*Assistant Examiner* — Michael Carter
(74) *Attorney, Agent, or Firm* — RG & Associates

(57) ABSTRACT

A system, method, and computer readable medium for increasing an upstream optical coding gain in a passive optical network (PON). In an exemplary embodiment of the invention, the system may include a memory structured to store Optical Network Terminator (ONT) burst timing values, and provide a previous burst timing value of the burst timing values to a translator. Further, an upstream burst grant timing scheduler may provide a scheduled timing value to the translator, wherein the translator may be structured to translate the previous burst timing value to a new expected timing value per an ONT upstream burst in association with the scheduled timing value. Also, a delimiter match and search block may be structured to use the new expected timing value to check a bit stream for a delimiter pattern match. An alarm counter may be provided in the system that is structured to provide an alarm when the delimiter pattern match is not found.

17 Claims, 4 Drawing Sheets

SYSTEM AND METHOD FOR INCREASING UPSTREAM OPTICAL CODING GAIN IN A GIGABIT PASSIVE OPTICAL NETWORK (GPON)

FIELD OF THE INVENTION

The present invention is generally related to Gigabit Passive Optical Networks (GPONs) and, more specifically, to increasing an upstream optical coding gain in a GPON using temporal tracking in the delimiter recovery process.

BACKGROUND OF THE INVENTION

A passive optical network (PON) is used in an access network for delivering broadband services such as Internet access, digital television and telephone service, to residential and business subscribers (i.e., customers of the service provider). The essence of a PON is that nothing but optical fiber and passive components are found in the path between the central office and subscribers. A single fiber can run from the central office to a passive splitter located near a group of subscribers, such as a neighborhood or office complex, and individual fibers can run from the splitter to individual subscribers or sub-groups of subscribers. The International Telecommunications Union (ITU) and the Institute of Electrical and Electronics Engineers (IEEE) are two standards-making bodies currently developing PON standards. The ITU has adopted recommendations of the Full Service Access Networks (FSAN) organization, including G983.x, a specification sometimes referred to as "broadband PON" (BPON), and G984.x, a specification sometimes referred to as "gigabit PON" (GPON). The IEEE has also adopted Ethernet-based (i.e., IEEE 802.3-based) PON standards referred to as "Ethernet PON" (EPON) and "gigabit EPON" (GEPON). These standards and recommendations are known to persons skilled in the art to which the invention relates and are therefore not described in further detail in this patent specification. Although the term GPON may be used herein for convenience with regard to embodiments of the present invention described below, the invention can be applied to any suitable PON technology.

As illustrated in FIG. 1, in a related art arrangement for delivering services to subscribers, a PON 10 includes an Optical Line Terminal (OLT) 12 (also known as optical line terminator) optically coupled to a number of Optical Network Terminators (ONTs) 14 (also known as optical network terminals and optical network units) by an arrangement of optical fibers 16 that includes one or more optical splitters (not separately shown for purposes of clarity). Each ONT 14 can be connected to various customer premises equipment (CPE) 18, such as a residential local area network (LAN) router, telephone, television, etc.

In the downstream direction, i.e., data transmitted from OLT 12 (e.g., located at the central office) to an ONT 14 (e.g., located at a subscriber's premises), the data packets are broadcast from OLT 12 to all of ONTs 14, and an ONT 14 can select the data to receive by matching the address embedded in the data packets to a previously provisioned or learned address. In other words, an ONT 14 only "listens" to data packets having a matching address. Thus, OLT 12 can transmit data "downstream" to a particular or selected ONT 14 by addressing it to that ONT. In the "upstream" direction, i.e., data transmitted from an ONT 14 to OLT 12, the data packets are time-division multiplexed.

In a GPON system, the realizable upstream data Reed Solomon Forward Error Correction (RS FEC) optical coding gain attainable is related to the ability to recover the delimiter field correctly. The delimiter field is an embedded piece of information placed there to assist an upstream OLT data receiver in aligning the recovered framing. If the delimiter field is not found or incorrectly found, the entire upstream data burst arriving at the OLT from the ONT is recovered incorrectly and subsequently lost. This situation results in multiple transmissions required to move upstream data from the ONT to the OLT.

Existing OLT solutions utilize a delimiter search method which looks within multiple recovered framing bytes to find the upstream burst alignment. The existing search method will tolerate at most one bit error within a 2.5 byte delimiter field. The existing search method is repeated independently for every received upstream burst.

Related art existing solutions search into the bit interleaved parity (BIP) block of the upstream framing when looking for the delimiter. This BIP value changes every upstream burst and is dependent on the actual data transmitted in the previous upstream burst. This opens up the possibility that the changing BIP values may take on some of the same values as the correct delimiter values but offset in time from the correct delimiter. This is essentially a "false match" if the correct delimiter alignment is experiencing a bit error at this instant or a "multiple delimiter match" condition occurs within the delimiter search range. Either of these results may cause the recovered upstream data to be incorrect.

If the delimiter can not be correctly found within the upstream burst, RS FEC cannot provide increased optical coding gain. Since the GPON standard does not make the delimiter more robust or protect it from error conditions, an optical coding gain which RS FEC may provide cannot be realized. When working correctly, RS FEC allows the optical link bit error rate (BER) to be of lower quality as data bit errors can be corrected for the user data. However, this means that the delimiter which is not covered by RS FEC capability must be recovered under the more stressful operating conditions where bit errors are present.

Related art delimiter recovery approaches do not use knowledge of previous upstream bursts recovered to aid in delimiter recovery. In fact, when multiple delimiter matches are found within the search range, the entire upstream data burst is often discarded.

Current GPON implementations can only recover 0.5 dB or less of RS FEC optical coding gain.

BRIEF SUMMARY OF THE INVENTION

The present invention introduces temporal tracking into the delimiter recovery process. By using knowledge of previous upstream burst recovery timing for each ONT on the PON, a comparison between the expected delimiter alignment and the current burst alignment can be made. This information may be used to aid in determining when/where bit errors have occurred and, if multiple delimiter matches occur, which delimiter match choice is most likely the correct one. This additional information can also be used to narrow the search range for the delimiter.

In one embodiment, a system for increasing an upstream optical coding gain in a passive optical network (PON) is provided. The system may include a memory structured to store Optical Network Terminator (ONT) burst timing values, and provide a previous burst timing value of the burst timing values to a translator. Further, an upstream burst grant timing scheduler may provide a scheduled timing value to the translator, wherein the translator may be structured to translate the previous burst timing value to a new expected timing value per an ONT upstream burst in association with the scheduled timing value. Also, a delimiter match and search block may be structured to use the new expected timing value to check a bit stream for a delimiter pattern match. An alarm counter may be provided in the system that is structured to provide an alarm when the delimiter pattern match is not found.

In another embodiment, a method for increasing an upstream optical coding gain in PON is provided. The method includes storing Optical Network Terminator (ONT) burst timing values, and providing a previous burst timing value of the burst timing values to a translator. A scheduled timing value is also provided to the translator. The method further includes translating the previous burst timing value to a new expected timing value per an ONT upstream burst in association with the scheduled timing value, and checking a bit stream for a delimiter pattern match using the new expected timing value.

In a further embodiment, a computer readable medium is provided for increasing an upstream optical coding gain in a PON, the computer readable medium having computer-executable instructions for execution by a processing system, the computer-executable instructions for: storing Optical Network Terminator (ONT) burst timing values, and providing a previous burst timing value of the burst timing values to a translator; providing a scheduled timing value to the translator; translating the previous burst timing value to a new expected timing value per an ONT upstream burst in association with the scheduled timing value; and checking a bit stream for a delimiter pattern match using the new expected timing value.

DETAILED DESCRIPTION OF THE INVENTION

Figure 1:
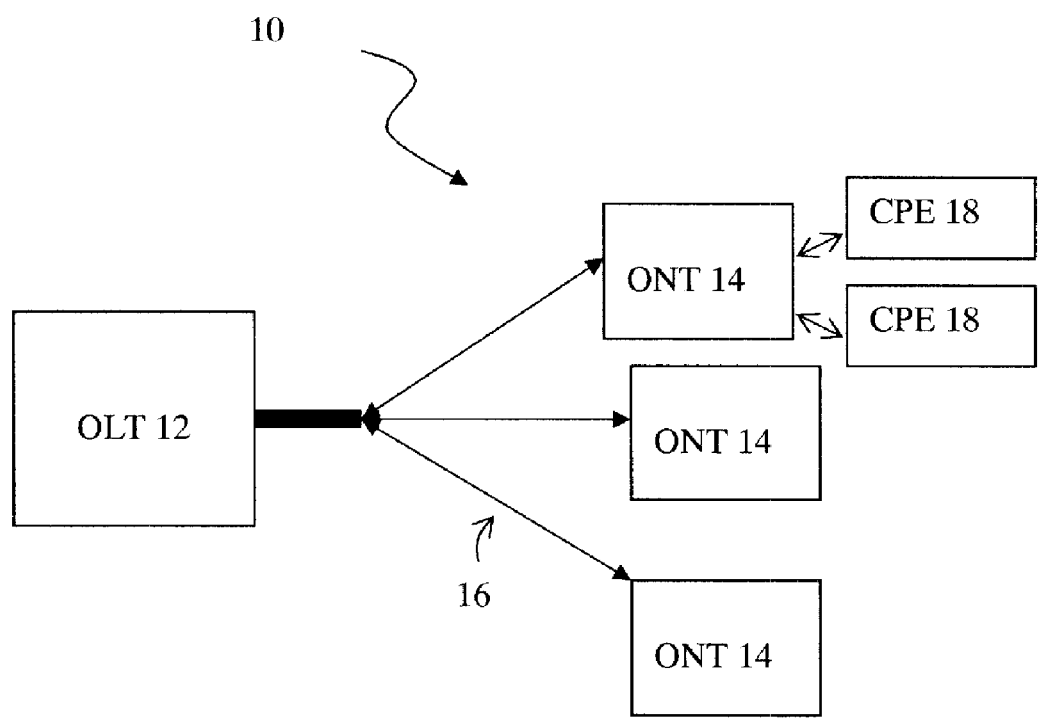
FIG. 1 is a block diagram of a related art passive optical network.
Figure 2:
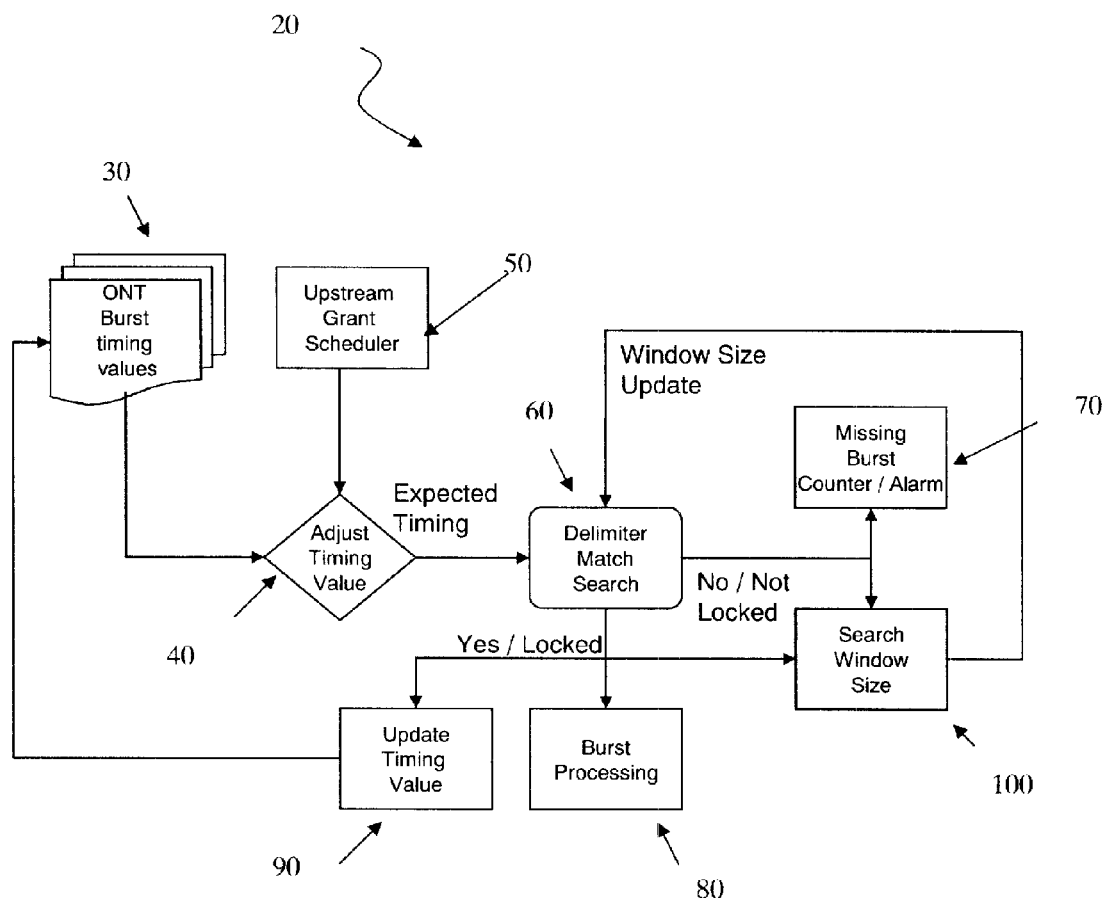
FIG. 2 depicts a system for increasing an upstream optical coding gain in a passive optical network according to an exemplary embodiment of the invention.

FIG. 2 depicts a system 20 for increasing an upstream optical coding gain in a passive optical network (PON) according to an exemplary embodiment of the invention. The exemplary system may take several forms such as implementation as a series of functional blocks in memory or silicon to enable the system to operate at the upstream line rate of about 1.25 Gbps.

As shown in FIG. 2, a memory 30 stores Optical Network Terminator (ONT) burst timing values, and may provide a previous burst timing value of the burst timing values to a translator 40. The ONT burst timing values may be associated with previously recovered delimiter locations for each ONT of the PON.

An upstream burst grant timing scheduler 50 of the system may provide a scheduled timing value to the translator 40. The translator 40 may translate the previous burst timing value to a new expected timing value per an ONT upstream burst in association with the scheduled timing value.

In the exemplary embodiment, a delimiter match and search block 60 is structured to use the new expected timing value to check a bit stream for a delimiter pattern match. An alarm counter 70 may be used to provide an alarm when the delimiter pattern match is not found.

The system may include a burst processor 80 to process burst mode transmissions of the PON using the delimiter pattern match. A timing updater 90 may update timing values to the memory upon the delimiter pattern match. Further, a window searcher 100 may use the delimiter pattern match in resizing an upstream window of the PON.

In the exemplary embodiment, the system may be a gigabit passive optical network (GPON) having an upstream line rate of about 1.25 Gbps.

Figure 4:
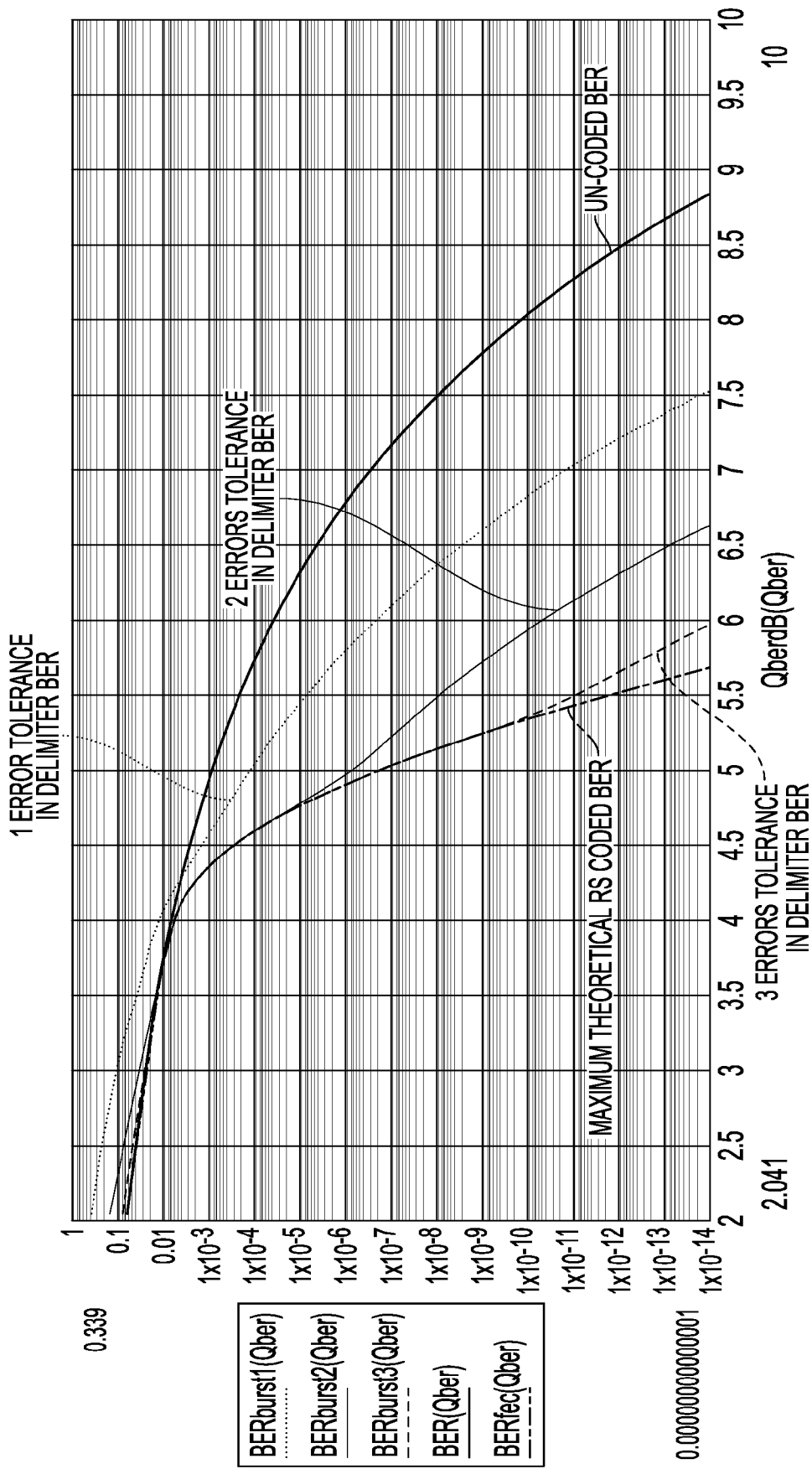
FIG. 4 depicts a graph that shows an uncoded bit-error rate (BER), the maximum theoretical Reed Solomon (RS) coded BER attainable, and the RS coded BER when limited by tolerance to 1 error, 2 errors, and 3 errors in a delimiter.

Referring now to FIG. 4, the delimiter may include a tolerance of up to 3 errors. The graph in FIG. 4 shows the uncoded bit-error rate (BER), the maximum theoretical Reed Solomon (RS) coded BER attainable, the RS coded BER when limited by tolerance to 1 error in the delimiter, the RS coded BER when limited by tolerance to 2 errors in the delimiter, and the RS coded BER when limited by tolerance to 3 errors in the delimiter. The difference between the uncoded BER and each line represents the attainable RS optical coding gain. From the curves, it can be seen that 3 or more errors may be tolerated in the delimiter in order to be able to have the system of the present invention attain the maximum coding gain possible for the GPON standard specified BER of $1 \times 10^{-10}$.

The Table below shows information derived from the BER curves from the Graph above and a measurement performed in the lab. Known related art deployed upstream burst mode configurations have a tolerance to only 1 bit error in the delimiter. Knowledge of measurements by ALU for this configuration of upstream RS optical coding gain has yielded values from 0 to 0.8 dB. With the invention, existing parameters were modified to accept up to 2 errors in the delimiter. The RS optical coding gain was re-measured for this condition. The results obtained are listed in the Table below. Note that in the data depicted in the Graph, no temporal feedback was used to arbitrate when more than one delimiter match occurred. Rather, the entire upstream burst was discarded when multiple delimiter matches were found within the search range. Hence, the values measured and shown in the Table are further improved upon when temporal feedback is also incorporated.

| BER Output | Maximum Theoretical RS Coding Gain [dB] | Measured US Coding Gain [dB] | Difference Between Measured & Maximum Theoretical Coding Gain [dB] | Single Bit Error Delimiter Tolerance US Coding Gain [dB] | Two Bit Error Delimiter Tolerance US Coding Gain [dB] | Three Bit Error Delimiter Tolerance US Coding Gain [dB] |
|---|---|---|---|---|---|---|
| 1.00E−05 | 1.5342 | 0.2 | 1.3342 | 0.8538 | 1.5154 | 1.5342 |
| 1.00E−06 | 1.8645 | 0.8 | 1.0645 | 0.973 | 1.8018 | 1.8645 |
| 1.00E−07 | 2.1295 | 1.1 | 1.0295 | 1.0579 | 1.9426 | 2.1295 |
| 1.00E−08 | 2.3497 | 1.3 | 1.0497 | 1.1213 | 2.0122 | 2.3471 |
| 1.00E−09 | 2.534 | 1.5 | 1.034 | 1.1687 | 2.0634 | 2.5276 |
| 1.00E−10 | 2.6925 | 1.7 | 0.9925 | 1.2075 | 2.1035 | 2.6748 |
| 1.00E−11 | 2.8301 | 2 | 0.8301 | 1.2386 | 2.1368 | 2.7746 |
| 1.00E−12 | 3.0103 | 2.2 | 0.8103 | 1.2638 | 2.1637 | 2.8206 |
| 1.00E−13 | 3.0579 | 2.3 | 0.7579 | 1.2858 | 2.1859 | 2.8445 |

With the present invention, an improved delimiter matching scheme may yield additional RS optical coding gain in the range of 2+ dB greater than in the related art. This is particularly useful considering that for every 3 dB optical budget improvement, the number of subscribers served by a PON may be doubled.

Figure 3:
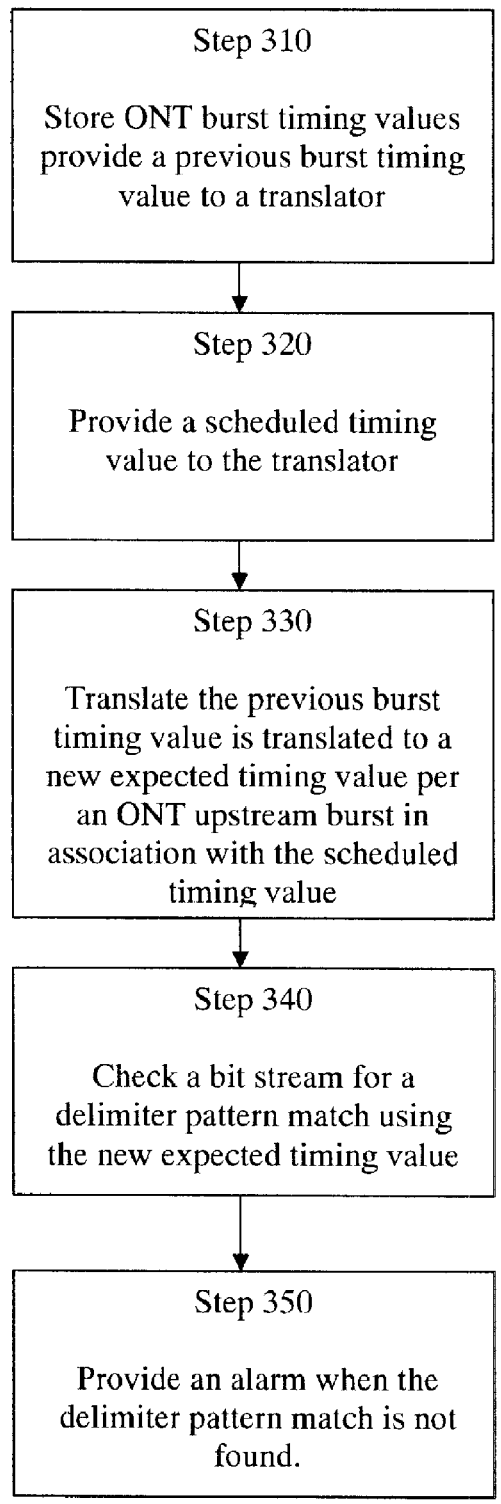
FIG. 3 depicts a method for increasing an upstream optical coding gain in a passive optical network according to an exemplary embodiment of the invention.

FIG. 3 depicts a method for increasing an upstream optical coding gain in a passive optical network according to an exemplary embodiment of the invention. As shown in FIG. 3, in step 310, ONT burst timing values are stored, and provided to a previous burst timing value of the burst timing values to a translator.

In step 320, a scheduled timing value is also provided to the translator. Next, in step 330, the previous burst timing value is translated to a new expected timing value per an ONT upstream burst in association with the scheduled timing value.

In step 340, a bit stream may be checked for a delimiter pattern match using the new expected timing value. An alarm may be provided in step 350 when the delimiter pattern match is not found.

In the invention, a computer readable medium (not shown) for increasing an upstream optical coding gain in a PON may be embodied. The computer readable medium may include computer-executable instructions for execution by a processing system to carry out the method of the invention.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

What is claimed is:

1. A system for increasing an upstream optical coding gain in a passive optical network (PON), the system comprising:
   a memory structured to store Optical Network Terminator (ONT) burst timing values, and provide a previous burst timing value of the burst timing values;
   an upstream burst grant timing scheduler structured to provide a scheduled timing value;
   a translator structured to translate the previous burst timing value to a new expected timing value per an ONT upstream burst in association with the scheduled timing value;
   a delimiter match and search block structured to use the new expected timing value to check a bit stream for a delimiter pattern match; and
   a window searcher structured to use the delimiter pattern match in resizing an upstream window of the PON.

2. The system of claim 1, further comprising an alarm counter structured to provide an alarm when the delimiter pattern match is not found.

3. The system of claim 1, wherein the ONT burst timing values are associated with previously recovered delimiter locations for each ONT of the PON.

4. The system of claim 1, further comprising a burst processor to process burst mode transmissions of the PON using the delimiter pattern match.

5. The system of claim 1, further comprising a timing updater structured to provide updated timing values to the memory upon the delimiter pattern match.

6. The system of claim 1, wherein the PON is a gigabit passive optical network (GPON) having an upstream line rate of about 1.25 Gbps.

7. The system of claim 1, wherein the delimiter pattern match includes a tolerance of up to 3 errors.

8. A method for increasing an upstream optical coding gain in a passive optical network (PON), the method comprising:
   storing Optical Network Terminator (ONT) burst timing values, and providing a previous burst timing value of the burst timing values to a translator;
   providing a scheduled timing value to the translator;
   translating the previous burst timing value to a new expected timing value per an ONT upstream burst in association with the scheduled timing value;
   checking a bit stream for a delimiter pattern match using the new expected timing value; and
   resizing an upstream window of the PON based on the delimiter pattern match.

9. The method of claim 8, further comprising providing an alarm when the delimiter pattern match is not found.

10. The method of claim 8, wherein the ONT burst timing values are associated with previously recovered delimiter locations for each ONT of the PON.

11. The method of claim 8, further comprising processing burst mode transmissions of the PON using the delimiter pattern match.

12. The method of claim 8, further comprising providing updated timing values to the memory when the delimiter pattern match is made.

13. The method of claim 8, further comprising using an upstream line rate of about 1.25 Gbps in the PON, wherein the delimiter pattern match includes a tolerance of up to 3 errors.

14. A non-transitory computer readable storage medium for increasing an upstream optical coding gain in a passive optical network (PON), the computer readable storage medium having computer-executable instructions for execution by a processing system, the processing system being configured to perform:

storing Optical Network Terminator (ONT) burst timing values, and providing a previous burst timing value of the burst timing values to a translator;

providing a scheduled timing value to the translator;

translating the previous burst timing value to a new expected timing value per an ONT upstream burst in association with the scheduled timing value;

checking a bit stream for a delimiter pattern match using the new expected timing value; and resizing an upstream window of the PON based on the delimiter pattern match.

15. The non-transitory computer-readable storage medium of claim 14, wherein the processing system is further configured to perform providing an alarm when the delimiter pattern match is not found.

16. The non-transitory computer-readable storage medium of claim 14, wherein the processing system is further configured to perform processing burst mode transmissions of the PON using the delimiter pattern match.

17. The non-transitory computer-readable storage medium of claim 14, wherein the processing system is further configured to perform providing updated timing values to the memory when the delimiter pattern match is made.

\* \* \* \* \*